(12) United States Patent
Hwang et al.

(10) Patent No.: US 8,706,120 B2
(45) Date of Patent: Apr. 22, 2014

(54) MOBILE TELECOMMUNICATION SYSTEM WITH ADAPTIVE HANDOFF MECHANISM AND METHOD OF OPERATION THEREOF

(75) Inventors: Insoo Hwang, San Diego, CA (US);
Jungwon Lee, San Diego, CA (US);
Heejin Roh, San Diego, CA (US);
Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 127 days.

(21) Appl. No.: 13/324,988

(22) Filed: Dec. 13, 2011

(65) Prior Publication Data

US 2012/0238272 A1    Sep. 20, 2012

Related U.S. Application Data

(60) Provisional application No. 61/454,555, filed on Mar. 20, 2011.

(51) Int. Cl.
*H04W 4/00* (2009.01)
*H04W 36/00* (2009.01)

(52) U.S. Cl.
USPC ........... 455/436; 455/442; 455/437; 455/438; 455/440; 455/441; 370/331; 370/332

(58) Field of Classification Search
USPC ......... 455/436, 446, 442, 437, 438, 440, 441; 370/331, 332
See application file for complete search history.

(56) References Cited

U.S. PATENT DOCUMENTS

| | | | | |
|---|---|---|---|---|
| 5,379,446 A | * | 1/1995 | Murase | 455/444 |
| 2011/0092210 A1 | * | 4/2011 | Kumar et al. | 455/436 |

OTHER PUBLICATIONS

Kimou et al., "Handover within 3GPP LTE: Design Principles and Performance", "Vehicular Technology Conference", VTC Fall 2009, p. 5 pages, vol. 70th, Publisher: IEEE.

Hwang et al., "Adaptive Handover Algorithms Based on Reference Signal Estimation and Prediction", Mar. 20, 2011, p. 13 pages, Publisher: Mobile Solutions Lab, Samsung Information Systems America, Inc., Published in: San Diego.

* cited by examiner

*Primary Examiner* — Opiribo Georgewill
(74) *Attorney, Agent, or Firm* — IP Investment Law Group

(57) ABSTRACT

A method of operation of a mobile telecommunication system includes: measuring a measured target power and a measured server power; predicting a future target power and a future server power for a prediction tap number from when the measured target power and the measured server power are measured; computing an estimation error and a prediction error associated with the future target power and the future server power; determining a handoff hysteresis level based on the estimation error and the prediction error; and sending a handoff trigger for transferring a mobile station from a server station to a target station when the future target power minus both the future server power and the handoff hysteresis level is greater than zero.

18 Claims, 5 Drawing Sheets

MOBILE TELECOMMUNICATION SYSTEM WITH ADAPTIVE HANDOFF MECHANISM AND METHOD OF OPERATION THEREOF

CROSS-REFERENCE TO RELATED APPLICATION(S)

This application claims the benefit of U.S. Provisional Patent Application Ser. No. 61/454,555 filed Mar. 20, 2011, and the subject matter thereof is incorporated herein by reference thereto.

TECHNICAL FIELD

The present invention relates generally to a mobile telecommunication system, and more particularly to a mobile telecommunication system with adaptive handoff mechanism.

BACKGROUND ART

Modern portable consumer and industrial electronics, especially client devices such as cellular phones, portable digital assistants, navigation systems, and combination devices, are providing increasing levels of functionality to support modern life including mobile data and voice services. Research and development in the existing technologies can take a myriad of different directions.

As users become more empowered with the growth of mobile service devices, new and old paradigms of cellular service stations are becoming essential for users to take advantage of this new mobile data and voice space. Base stations ("BS") can provide mobile data and voice services. Base stations allow a Mobile Station ("MS"), such as a User Equipment ("UE"), to connect to its voice or data services remotely via radio frequency communication. Handoff mechanisms, sometimes refers to as handover mechanisms, help the mobile station and the base stations determine the proper time to switch the mobile station from one base station to another.

Mobile telecommunication systems have been incorporated in cell phones, handheld devices, automobiles, notebooks, and other portable products. Today, these systems aid users by identifying and initiating proper handoff procedures between the mobile station and the nearby servicing base stations. The proper handoff procedures prevent interruption of services because of weak signal, delay, or overloading of the base stations. However, the failure rate of these handoff mechanisms continues to challenge commercial applicability of these systems.

Thus, a need still remains for a mobile telecommunication system with a handoff mechanism to identify the proper time to initiate a handoff procedure. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a mobile telecommunication system including: measuring a measured target power and a measured server power; predicting a future target power and a future server power for a prediction tap number from when the measured target power and the measured server power are measured; computing an estimation error and a prediction error associated with the future target power and the future server power; determining a handoff hysteresis level based on the estimation error and the prediction error; and sending a handoff trigger for transferring a mobile station from a server station to a target station when the future target power minus both the future server power and the handoff hysteresis level is greater than zero.

The present invention provides a mobile telecommunication system including: a channel estimation module, for measuring a measured target power and a measured server power; a channel prediction module, coupled to the channel estimation module, for predicting a future target power and a future server power for a prediction tap number from when the measured target power and the measured server power are measured; an error module, coupled to the channel prediction module, for computing an estimation error and a prediction error associated with the future target power and the future server power; a hysteresis level module, coupled to the error module, for determining a handoff hysteresis level based on the estimation error and the prediction error; and a trigger handoff module, coupled to the hysteresis level module, for sending a handoff trigger for transferring a mobile station from a server station to a target station when the future target power minus both the future server power and the handoff hysteresis level is greater than zero.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
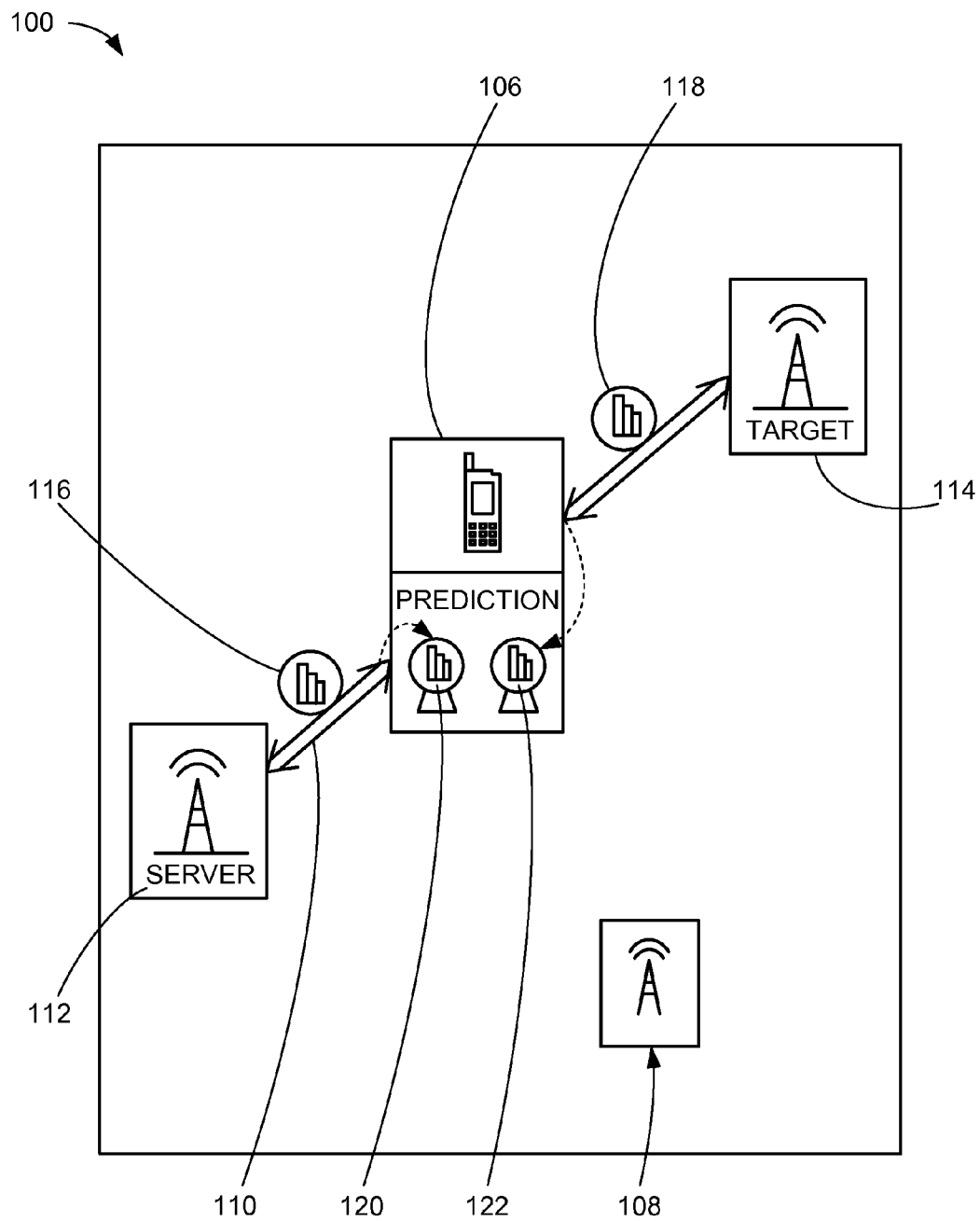
FIG. 1 is a mobile telecommunication system with adaptive handoff mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. As a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a mobile telecommunication system 100 with adaptive handoff mechanism in an embodiment of the present invention. The mobile telecommunication system 100 includes a mobile station 106, such as a user equipment (UE), connected through a communication channel 110 to at least one of base stations 108, such as a plurality of evolved Node B (eNB). The mobile station 106 is defined as an electronic device that is portable. The base stations 108 are defined as an electronic device that is used to relay electronic messages and signals from and to the mobile station 106.

For example, the communication channel 110 can be a wireless radio frequency channel, a multi-channel cellular network, an Evolved High Speed Packet Access ("HSPA+") network, a Third Generation Partnership Project Long Term Evolution ("3GPP LTE") network, a 3GPP LTE-Advanced network, or other cellular network.

For example, the mobile station 106 can be of any of a variety of mobile devices, such as a cellular phone, personal digital assistant, a notebook computer, automotive telematic navigation system, or other multi-functional mobile communication or entertainment device. The mobile station 106 can be a standalone device, or can be incorporated with a vehicle, for example a car, truck, bus, or train. The mobile station 106 can couple to the communication channel 110 to communicate with the base stations 108.

The base stations 108 can be any of a variety of centralized or decentralized computing devices. For example, the base stations 108 can be cellular routing devices, cell tower systems, evolved nodes B ("eNB"s), computers, grid computing resources, virtualized computer resources, cloud computing resources, routers, switches, peer-to-peer distributed computing devices, or a combination thereof.

Each of the base stations 108 can be centralized in a single computer room, distributed across different rooms, attached to a building, distributed across different geographical locations, embedded within a telecommunications network, or attached to a tower. The base stations 108 can have a means for coupling with the communication channel 110 to communicate with the mobile station 106. The base stations 108 can also include a mobile type device as described for the mobile station 106.

The base stations 108 can include a server station 112 and a target station 114. The mobile station 106 can communicate with the server station 112 and the target station 114. For illustrative purposes, there is shown only the server station 112 as a single station, but it is understood that there can be a plurality of the server station 112.

The server station 112 is defined as at least one of the base stations 108 that is currently serving the mobile station 106 for providing an external communication connection including voice, data, or a combination thereof. The target station 114 is defined as one of the base stations 108 that is a potential replacement for the server station 112 based on the movement of the mobile station 106. The mobile station 106 can communicate with the server station 112, the target station 114, or both.

In another example, the base stations 108 can include a particularized mobile machine, such as a mobile mainframe, a mobile server, a cluster server, rack mounted server in a vehicle, or a mobile blade server, or as more specific examples, an IBM System z10 ™ Business Class mainframe in a vehicle or a HP ProLiant ML™ server in a vehicle. Yet another example, the mobile station 106 can be a particularized machine, such as a portable computing device, a thin client, a notebook, a netbook, a smartphone, personal digital assistant, or a cellular phone, and as specific examples, a Samsung Galaxy Tab™, an Apple iPhone™, Palm Centro™, or Moto Q Global™.

For illustrative purposes, the mobile telecommunication system 100 is described with the base stations 108 as structures containing a computing device, although it is understood that the base stations 108 can be different types of computing devices. For example, the base stations 108 can also be a mobile computing device, such as notebook computer, another mobile device, or a different type of mobile device. The base stations 108 can be standalone devices, or can be incorporated with vehicles, for example cars, trucks, buses, or trains. The base stations 108 can be towers or buildings containing a mobile computing device or a standalone device.

Also for illustrative purposes, the mobile telecommunication system 100 is shown with the base stations 108 and the mobile station 106 as end points of the communication channel 110, although it is understood that the mobile telecommunication system 100 can have a different partition between the mobile station 106, the base stations 108, and the communication channel 110. For example, the mobile station 106, the base stations 108, or a combination thereof can also function as part of the communication channel 110.

The communication channel 110 can be a variety of networks. For example, the communication channel 110 can include radio frequency communication, wireless communication, optical, or any combination thereof. Satellite communication, cellular communication, and worldwide interoperability for microwave access (WiMAX) are examples of wireless communication that can be included in the communication channel 110.

The mobile station 106 can determine a measured server power 116 from the communication channel 110. The measured server power 116 is the reference signal received power (RSRP) from the server station 112 through the communication channel 110 measured at the mobile station 106. The RSRP is defined as power for each of the base stations 108 as the linear average over the power contributions of the resource elements that carry cell-specific reference signals within the considered measurement frequency bandwidth.

The base stations 108 establish cells by broadcasting their respective cell selection reference signals. The size of each cell is defined by the size of an area in which the cell selection reference signal reaches at a predetermined power value. The mobile station 106 establishes a connection for communication with the server station 112 from which it can receive the cell selection reference signal, preferably at maximum intensity. The measured server power 116 thus is the cell selection reference signal from the server station 112 measured at the mobile station 106. The measured server power 116 can be used as an approximation of the average reference signal power at a particular location in the cell established by the server station 112.

A measured target power 118 is the RSRP originating from the target station 114 through the communication channel 110 measured at the mobile station 106. The measured target power 118 can be used as an approximation of the average reference signal power at a particular location in the cell established by the target station 114. The measured server power 116 and the measured target power 118 can be referred to as an estimated RSRP because the measured reference signal power is used to approximate the average reference signal power unattenuated by channel characteristics.

The communication channel 110 from the base stations 108 to the mobile station 106 can include characteristics such as path loss, shadow fading, and fast fading. These characteristics can cause the measured server power 116 and the measured target power 118 to be attenuated, phase-shifted, or delayed. This can result in attenuation or amplification of the signal seen by the mobile station 106.

Path loss is defined as the RSRP long term attenuation level, where the attenuation level is determined by the parameter called path loss exponent. Fast fading is defined as a deviation of the attenuation of the RSRP over the communication channel 110. Fast fading occurs when the minimum time required for the magnitude change of a signal in the communication channel 110 to become uncorrelated from its previous value is small relative to the delay constraint of the communication channel 110. Fast fading can be average out as its correlation distance is much shorter than the RSRP sampling distance. Shadowing is modeled as a lognormal fading with a spatial dependency, where the correlation between adjacent RSRP is a function of measurement distance from the server station 112. The measured target power 118 and the measured server power 116 can reflect a mixture of these channel characteristics.

The measured target power 118 and the measured server power 116 reflect the measurement over a short period of time or a single time frame, which is not representative of the long term average RSRP from the base stations 108. A handoff decision can be made more accurate by correcting for the channel characteristics from the short term measurements. In order for the mobile station 106 to determine whether a handoff is necessary, the measured target power 118 and the measured server power 116 can be corrected by an estimation error model, including filtering to average out fast fading effects.

Further, an actual handoff event can occur a period of time after the RSRP measurements. The mobile station 106 can calculate a future server power 120 and a future target power 122, for a predicted handoff time in the future, from the measured server power 116 and the measured target power 118. A handoff event triggered by the mobile station 106 can depend on the future server power 120 and the future target power 122, or the measured server power 116 and the measured target power 118.

The physical transformation of a handoff of the mobile station 106 results in powering on of communication system of the target station 114 and powering down of the communication system of the server station 112 in the physical world. As a result of a handoff, the mobile telecommunication system 100 will also physically change its audio quality and display speed due to changes in the signal power of the base stations 108.

Figure 2:
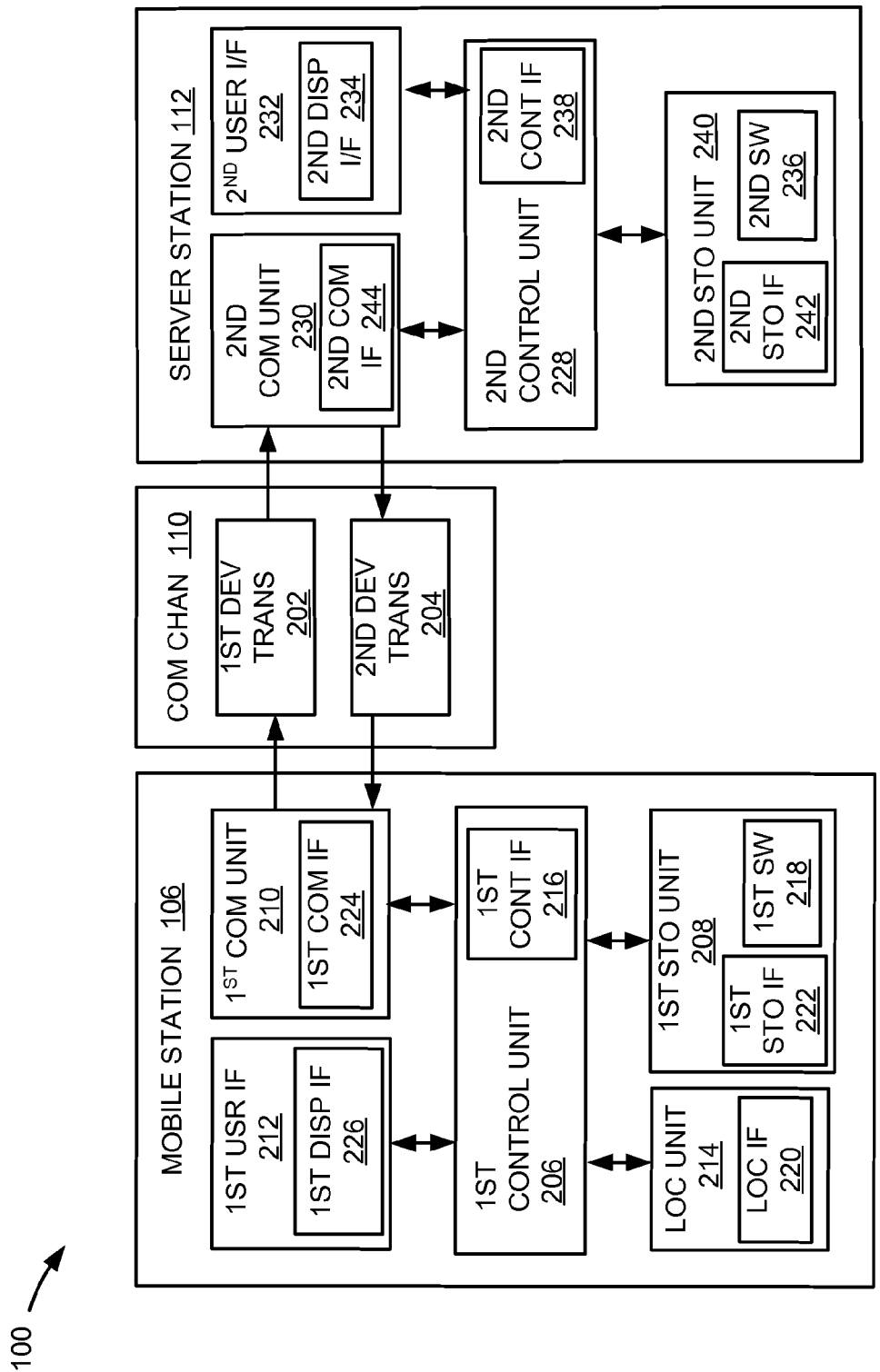
FIG. 2 is an exemplary block diagram of the mobile telecommunication system.

Referring now to FIG. 2, therein is shown an exemplary block diagram of the mobile telecommunication system 100. The mobile station 106 can send information in a first device transmission 202 over the communication channel 110 of FIG. 1 to the base stations 108 of FIG. 1. The mobile station 106 can receive information in a second device transmission 204 over the communication channel 110 from the base stations 108.

The mobile station 106 can include a first control unit 206, a first storage unit 208, a first communication unit 210, a first user interface 212, and a location unit 214. The first control unit 206 can include a first control interface 216. The first control unit 206 can execute a first software 218 to provide the intelligence of the mobile telecommunication system 100 of FIG. 1. The first control unit 206 can be implemented in a number of different manners. For example, the first control unit 206 can be a processor, an embedded processor, a microprocessor, a hardware control logic, a hardware finite state machine (FSM), a digital signal processor (DSP), or a combination thereof. The first control interface 216 can be used for communication between the first control unit 206 and other functional units in the mobile station 106. The first control interface 216 can also be used for communication that is physically separated from the mobile station 106.

The first control interface 216 can receive information from the other functional units or from external sources, or can transmit information to the other functional units or to external destinations. The external sources and the external destinations refer to sources and destinations physically separated from the mobile station 106.

The first control interface 216 can be implemented in different ways and can include different implementations depending on which functional units or external units are being interfaced with the first control interface 216. For example, the first control interface 216 can be implemented with a pressure sensor, an inertial sensor, a microelectromechanical system (MEMS), optical circuitry, waveguides, wireless circuitry, wireline circuitry, or a combination thereof.

The location unit 214 can generate location information, current heading, and current speed of the mobile station 106, as examples. The location unit 214 can be implemented in many ways. For example, the location unit 214 can function as at least a part of a global positioning system (GPS), an inertial navigation system, a cellular-tower location system, a pressure location system, or any combination thereof.

The location unit 214 can include a location interface 220. The location interface 220 can be used for communication between the location unit 214 and other functional units in the mobile station 106. The location interface 220 can also be used for communication that is external to the mobile station 106.

The location interface 220 can receive information from the other functional units or from external sources, or can transmit information to the other functional units or to external destinations. The external sources and the external destinations refer to sources and destinations physically separated from the mobile station 106.

The location interface 220 can include different implementations depending on which functional units or external units are being interfaced with the location unit 214. The location interface 220 can be implemented with technologies and techniques similar to the implementation of the first control interface 216.

The first storage unit 208 can store the first software 218. The first storage unit 208 can also store the relevant information, such as list of nearby cell towers, number of handoffs made, number of service failures, battery power meter, communication channel access codes, or any combination thereof.

The first storage unit 208 can be a volatile memory, a nonvolatile memory, an internal memory, an external memory, or a combination thereof. For example, the first storage unit 208 can be a nonvolatile storage such as nonvolatile random access memory (NVRAM), Flash memory, disk storage, or a volatile storage such as static random access memory (SRAM).

The first storage unit 208 can include a first storage interface 222. The first storage interface 222 can be used for communication between the first storage unit 208 and other functional units in the mobile station 106. The first storage interface 222 can be used for communication that is external to the mobile station 106.

The first storage interface 222 can receive information from the other functional units or from external sources, or can transmit information to the other functional units or to external destinations. The external sources and the external destinations refer to sources and destinations physically separated from the mobile station 106.

The first storage interface 222 can include different implementations depending on which functional units or external units are being interfaced with the first storage unit 208. The first storage interface 222 can be implemented with technologies and techniques similar to the implementation of the first control interface 216.

The first communication unit 210 can enable external communication to and from the mobile station 106. For example, the first communication unit 210 can permit the mobile station 106 to communicate with the base stations 108 of FIG. 1, such as the server station 122, the target station 114, a peripheral device or a computer desktop, and the communication channel 110.

The first communication unit 210 can also function as a communication hub allowing the mobile station 106 to function as part of the communication channel 110 and not limited to be an end point or terminal unit to the communication channel 110. The first communication unit 210 can include active and passive components, such as microelectronics or an antenna, for interaction with the communication channel 110.

The first communication unit 210 can include a first communication interface 224. The first communication interface 224 can be used for communication between the first communication unit 210 and other functional units in the mobile station 106. The first communication interface 224 can receive information from the other functional units or can transmit information to the other functional units.

The first communication interface 224 can include different implementations depending on which functional units are being interfaced with the first communication unit 210. The first communication interface 224 can be implemented with technologies and techniques similar to the implementation of the first control interface 216.

The first user interface 212 allows a user (not shown) to interface and interact with the mobile station 106. The first user interface 212 can include an input device and an output device. Examples of the input device of the first user interface 212 can include a keypad, a touchpad, soft-keys, a keyboard, a microphone, or any combination thereof to provide data and communication inputs.

The first user interface 212 can include a first display interface 226. The first display interface 226 can include a display, a projector, a video screen, a speaker, or any combination thereof.

The first control unit 206 can operate the first user interface 212 to display information generated by the mobile telecommunication system 100. The first control unit 206 can also execute the first software 218 for the other functions of the mobile telecommunication system 100, including receiving location information from the location unit 214. The first control unit 206 can further execute the first software 218 for interaction with the communication channel 110 via the first communication unit 210.

The server station 112 of FIG. 1 can be optimized for implementing the present invention in a multiple device embodiment with the mobile station 106. The server station 112 can provide the additional or higher performance processing power compared to the mobile station 106. The server station 112 can include a second control unit 228, a second communication unit 230, and a second user interface 232.

The second user interface 232 allows a user (not shown) to interface and interact with the server station 112. The second user interface 232 can include an input device and an output device. Examples of the input device of the second user interface 232 can include a keypad, a touchpad, soft-keys, a keyboard, a microphone, or any combination thereof to provide data and communication inputs. Examples of the output device of the second user interface 232 can include a second display interface 234. The second display interface 234 can include a display, a projector, a video screen, a speaker, or any combination thereof.

The second control unit 228 can execute a second software 236 to provide the intelligence of the server station 112 of the mobile telecommunication system 100. The second software 236 can operate in conjunction with the first software 218. The second control unit 228 can provide additional performance compared to the first control unit 206.

The second control unit 228 can operate the second user interface 232 to display information. The second control unit 228 can also execute the second software 236 for the other functions of the mobile telecommunication system 100, including operating the second communication unit 230 to communicate with the mobile station 106 over the communication channel 110.

The second control unit 228 can be implemented in a number of different manners. For example, the second control unit 228 can be a processor, an embedded processor, a microprocessor, a hardware control logic, a hardware finite state machine (FSM), a digital signal processor (DSP), or a combination thereof.

The second control unit 228 can include a second control interface 238. The second control interface 238 can be used for communication between the second control unit 228 and other functional units in the server station 112. The second control interface 238 can also be used for communication that is external to the server station 112.

The second control interface 238 can receive information from the other functional units or from external sources, or can transmit information to the other functional units or to external destinations. The external sources and the external destinations refer to sources and destinations physically separate from the server station 112.

The second control interface 238 can be implemented in different ways and can include different implementations depending on which functional units or external units are being interfaced with the second control interface 238. For example, the second control interface 238 can be implemented with a pressure sensor, an inertial sensor, a microelectromechanical system (MEMS), optical circuitry, waveguides, wireless circuitry, wireline circuitry, or a combination thereof.

A second storage unit 240 can store the second software 236. The second storage unit 240 can also store the relevant information, such as identities of mobile devices connected, number of hand offs made, number of failures, number of mobile devices connected, or any combination thereof. The second storage unit 240 can be sized to provide the additional storage capacity to supplement the first storage unit 208.

For illustrative purposes, the second storage unit 240 is shown as a single element, although it is understood that the second storage unit 240 can be a distribution of storage elements. Also for illustrative purposes, the mobile telecommunication system 100 is shown with the second storage unit 240 as a single hierarchy storage system, although it is understood that the mobile telecommunication system 100 can have the second storage unit 240 in a different configuration. For example, the second storage unit 240 can be formed with different storage technologies forming a memory hierarchal system including different levels of caching, main memory, rotating media, or off-line storage.

The second storage unit 240 can be a volatile memory, a nonvolatile memory, an internal memory, an external memory, or a combination thereof. For example, the second storage unit 240 can be a nonvolatile storage such as non-volatile random access memory (NVRAM), Flash memory, disk storage, or a volatile storage such as static random access memory (SRAM).

The second storage unit 240 can include a second storage interface 242. The second storage interface 242 can be used for communication between the second storage unit 240 and other functional units in the server station 112. The second storage interface 242 can be used for communication that is external to the server station 112.

The second storage interface 242 can receive information from the other functional units or from external sources, or can transmit information to the other functional units or to external destinations. The external sources and the external destinations refer to sources and destinations physically separate from the server station 112.

The second storage interface 242 can include different implementations depending on which functional units or external units are being interfaced with the second storage unit 240. The second storage interface 242 can be implemented with technologies and techniques similar to the implementation of the second control interface 238.

The second communication unit 230 can enable external communication to and from the server station 112. For example, the second communication unit 230 can permit the server station 112 to communicate with the mobile station 106 over the communication channel 110.

The second communication unit 230 can also function as a communication hub allowing the server station 112 to function as part of the communication channel 110 and not limited to be an end point or terminal unit to the communication channel 110. The second communication unit 230 can include active and passive components, such as microelectronics or an antenna, for interaction with the communication channel 110.

The second communication unit 230 can include a second communication interface 244. The second communication interface 244 can be used for communication between the second communication unit 230 and other functional units in the server station 112. The second communication interface 244 can receive information from the other functional units or can transmit information to the other functional units.

The second communication interface 244 can include different implementations depending on which functional units are being interfaced with the second communication unit 230. The second communication interface 244 can be implemented with technologies and techniques similar to the implementation of the second control interface 238.

The first communication unit 210 can couple with the communication channel 110 to send information to the server station 112 in the first device transmission 202. The server station 112 can receive information in the second communication unit 230 from the first device transmission 202 of the communication channel 110.

The second communication unit 230 can couple with the communication channel 110 to send information to the mobile station 106 in the second device transmission 204. The mobile station 106 can receive information in the first communication unit 210 from the second device transmission 204 of the communication channel 110. The mobile telecommunication system 100 can be executed by the first control unit 206, the second control unit 228, or a combination thereof.

For illustrative purposes, the server station 112 is shown with the partition having the second user interface 232, the second storage unit 240, the second control unit 228, and the second communication unit 230, although it is understood that the server station 112 can have a different partition. For example, the second software 236 can be partitioned differently such that some or all of its function can be in the second control unit 228 and the second communication unit 230. Also, the server station 112 can include other functional units not shown in FIG. 2 for clarity.

The functional units in the mobile station 106 can work individually and independently of the other functional units. The mobile station 106 can work individually and independently from the server station 112 and the communication channel 110.

The functional units in the server station 112 can work individually and independently of the other functional units. The server station 112 can work individually and independently from the mobile station 106 and the communication channel 110.

For illustrative purposes, the mobile telecommunication system 100 is described by operation of the mobile station 106 and the server station 112. It is understood that the mobile station 106 and the server station 112 can operate any of the modules and functions of the mobile telecommunication system 100. For example, the mobile station 106 is described to operate the location unit 214, although it is understood that the server station 112 can also operate the location unit 214.

Figure 3:
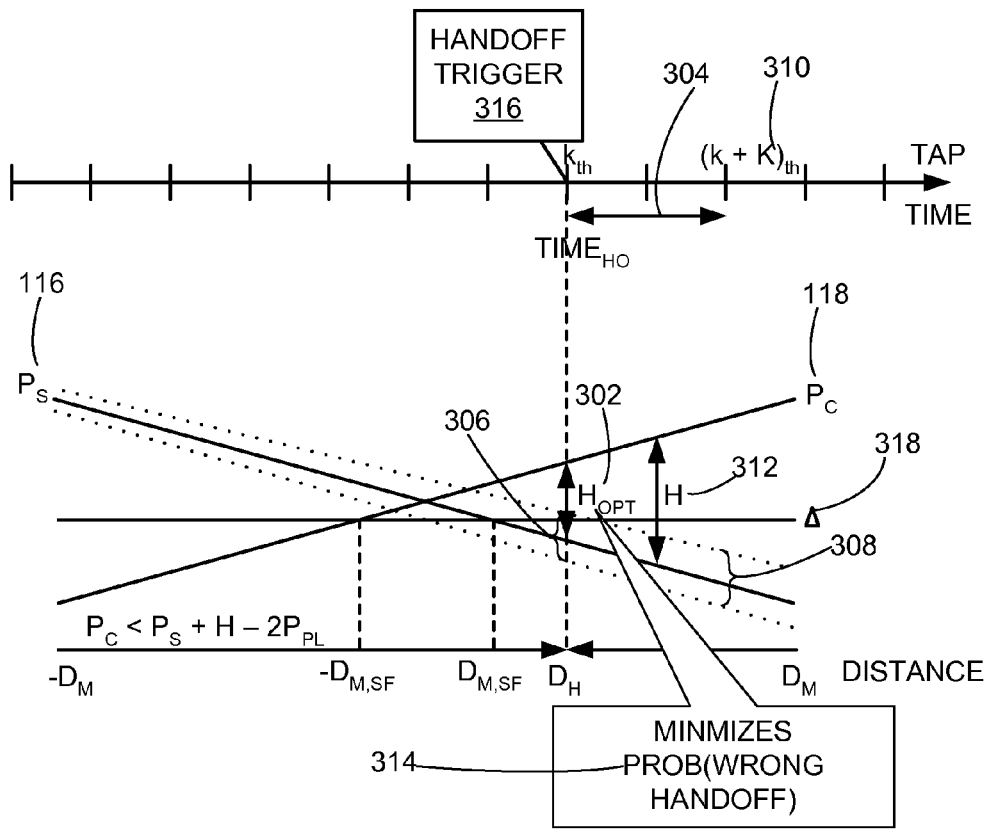
FIG. 3 is an example of a trace graph of path loss at a cell edge region of the server station of FIG. 1.

Referring now to FIG. 3, therein is shown an example of a trace graph of path loss at a cell edge region of the server station 112 of FIG. 1. FIG. 3 is used to illustrate a hysteresis handoff mechanism of the mobile telecommunication system 100 of FIG. 1. A handoff mechanism is defined as a procedure of the mobile telecommunication system 100 to switch from a connection between the mobile station 106 of FIG. 1 and the server station 112 to another connection between the mobile station 106 and the target station 114 of FIG. 1. The hysteresis handoff mechanism is a type of handoff mechanism where once the measured target power 118 increases to a pre-determined level above the measured server power 116, a handoff decision is made.

Whether the mobile station 106 should be handed off from the server station 112 to the target station 114 can be based on the measured server power 116 and the measured target power 118. For example, a hysteresis equation can be used to determine whether a handoff is appropriate. If the measured target power 118 is higher than the measured server power 116 by a handoff hysteresis level 302, the mobile station 106 can trigger a handoff.

Upon triggering a handoff, the server station 112 can then decide whether a handoff is necessary based on available resources of the server station 112 and the target station 114. The handoff hysteresis level 302 is defined as a RSRP difference threshold between the target station 114 and the server station 112 used in the hysteresis handoff mechanism to trigger a handoff event. The hysteresis handoff mechanism uses the RSRP difference threshold to make sure that the expected RSRP of the target station 114 is higher than the expected RSRP of the server station 112 before a handoff decision is made.

Further, to prevent unnecessary handoff due to short-term signal fluctuation such as fast fading, handoff mechanisms can trigger handoff only when the measured target power 118 from the target station 114 is higher than the measured server power 116 of the server station 112 by the handoff hysteresis level 302 for the duration longer than a time-to-trigger 304. The handoff hysteresis level 302 can be pre-calculated, adaptively determined by the mobile station 106, set by the base stations 108 of FIG. 1, or by the user of the mobile telecommunication system 100.

The handoff hysteresis level 302, if adaptively calculated, can prevent throughput loss and the decrease of the quality of service. The handoff can be delayed by the time-to-trigger 304, which can increase the service failure probability. These shortcomings of fixing the handoff hysteresis level 302 can be attributed to an estimation error 306 and a prediction error 308. Hysteresis handoff mechanism is subject to these types of errors.

The time-to-trigger 304 is defined as a delay in making the handoff, after the handoff decision is made. The time-to-trigger 304 can be, for example, the time between when a handoff decision is made and when a handoff command is sent. Further, the time-to-trigger 304 can be, for example, the time between when a handoff decision is made and when a handoff command is received by the base stations 108. Yet further, the time-to-trigger 304 can be, for example, the time between when a handoff command is sent and when a handoff actually takes place. The time-to-trigger 304 thus can capture a handful of potential fluctuations in the RSRP of the base stations 108 while a handoff is taking place. The time-to-trigger 304 can be based on the future target power 122 of FIG. 1 and the future server power 120 of FIG. 1, and thus the time-to-trigger 304 can be shorter if the RSRP prediction taps are used.

The estimation error 306 is defined as local deviations between the measured instances of RSRP, such as the measured target power 118 and the measured server power 116, from the long term average RSRP level. The prediction error 308 is defined as deviations between the predicted future RSRP levels and the actual future RSRP levels. The prediction error 308 can be introduced by partial correlation of adjacent RSRP taps.

The estimation error 306 exists when the mobile station 106 measures the measured target power 118 and the measured server power 116. The estimation error 306 can be proportional to the inverse of RSRP level. The estimation error 306 can be modeled as a zero mean Gaussian noise whose variance is inversely proportional to the measured target power 118 and the measured server power 116.

At a cell edge where the measured server power 116 is low due to high path loss, the estimation error 306 can be high, and thus the measured server power 116 can be inaccurate. The same can be true for the estimation error 306 of the measured target power 118. The estimation error 306 can make the handoff mechanism unstable, if the variance of the estimation error 306 is as high as the handoff hysteresis level 302. The estimation error 306 can change the variance of the probability distribution of a handoff occurring without changing the mean of the probability distribution of a handoff occurring operating under the hysteresis handoff mechanism.

To overcome the increase of service failure probability caused by the time-to-trigger 304 or other delays between when the decision of a handoff is made and when a handoff is executed, RSRP prediction can be used. The decision of a handoff can be based on measurements of the measured server power 116 and the measured target power 118. Predictions of the future server power 120 and the future target power 122 at a time when a handoff is expected to be executed can be useful in making the correct handoff decision at the time the measured server power 116 and the measured target power 118 are observed. However, RSRP prediction mechanisms can have the prediction error 308. The prediction error 308 can be proportional to the number of prediction taps.

Prediction of the future target power 122 and the future server power 120 can decrease service failure probability by accounting for RSRP delay and attenuation at the time of the predicted handoff. As described above, handoff mechanisms can include predicting a future RSRP level to overcome the handoff delay. The future target power 122 and the future server power 120 can be partially correlated due to shadow fading, and the correlation is a function of distance calculated by the sampling period multiplied by the mobile speed. Thus, the prediction mechanism can become inaccurate if the prediction tap is high. The mobile telecommunication system 100 can model the prediction error 308 as an additive white Gaussian noise, whose variance is proportional to a prediction tap number 310.

The prediction tap number 310 is defined as the number of sample taps to use in adjusting the time for handoff, where each tap signifies a measurement period. The prediction tap number 310 can be a pre-determined number stored on the first storage unit 208 of FIG. 2. The prediction tap number 310 can also be determined as a function of distance the mobile station 106 from the server station 112 or a function of the velocity of the mobile station 106.

The prediction error 308 can be modeled as a Gaussian random variable with the mean and variance described in the following Equations 1 and 2:

$$\mu_{k+K} = \mathbb{E}[P(k+K) \mid I_k] = a^K P(k) + \sum_{l=0}^{K-1} a^l (1-a)\mu + \sum_{l=0}^{K-1} a^l \left(\eta \log \frac{d(k+l+1)}{(d(k+l))^\alpha}\right), \quad \text{Eq. 1}$$

$$\sigma^2_{k+K} = \text{VAR}[P_s(k+K) \mid I_k] = \sigma^2(1-a^2)\sum_{l=0}^{K-1} a^{2l} \quad \text{Eq. 2}$$

$$= \sigma^2(1-a^{2K}).$$

Here, "K" represents the prediction tap number 310. "k" represents the current tap. "$I_k$" represents known information at current tap index "k". "P(k)" represents the measured RSRP value at the current time index "k". "P(k+K)" represents the predicted RSRP values. "$P_s(k+K)$" specifically represents the measured server power 116. In Equation 1, "a" represents the correlation coefficient. The correlation coefficient can be the exponent, exp(−ds/d0), where ds/d0 is the ratio of a sampling distance over a first distance. The sampling distance is the distance of the mobile station 106 from the server station 112, and the first distance is the distance of the mobile station 106 from the closest sampling point near the server station 112. Here, η represents the path-loss exponent associated with the server station 112.

However, it has been discovered that the handoff hysteresis level 302 can be adaptively updated in the mobile telecommunication system 100 to prevent throughput loss or the decrease of the quality of service despite the estimation error 306 and the prediction error 308. The handoff hysteresis level 302 can be optimized to adaptively correct for the estimation error 306 and the prediction error 308, and thus improve the quality of the mobile telecommunication service.

For example, to correct for the prediction error 308, the handoff hysteresis level 302 can be a default hysteresis level 312 minus two times the path loss change estimation as described below in Equation 2:

$$H_{opt} = H_{original} - 2P_L \qquad \text{Eq. 3}$$

$P_L$, the path loss change estimation, can be denoted as the last two terms of the Equation 1 above. $H_{original}$ is the default hysteresis level 312. The default hysteresis level 312 can be a pre-determined threshold value received from the server station 112. The default hysteresis level 312 can be made under the assumption of zero time to trigger.

To correct for both the estimation error 306 and the prediction error 308, the handoff hysteresis level 302 can be solved by finding the handoff hysteresis level 302 that minimizes a wrong handoff probability 314 at a predicted tap. The wrong handoff probability 314 can be a weighted sum of probabilities of missed handoffs, $Pr_M(k+K)$, and the probabilities of false handoffs, $Pr_F(k+K)$.

The missed handoff is defined as an event where no handoff occurs even when the handoff condition is met due to the estimation error 306 or the prediction error 308. The false handoff is defined as an event where a handoff event occurs even when the handoff condition is not met due to the effects of the estimation error 306 or the prediction error 308.

The handoff hysteresis level 302 can be summarized by the following Equation 4:

$$h_{opt} = \operatorname{argmin}_h Prw(k+K) \qquad \text{Eq. 4}$$
$$= \operatorname{argmin}_h \left\{ w_F \sum_{k=-Km}^{Kh} Pr_F(k+K) + w_M \sum_{k=Kh}^{Km} Pr_M(k+K) \right\}$$

Here, "$w_F$" represents a system-defined weight that signifies how much less desirable a false handoff is compared to a missed handoff. "$w_M$" represents a system-defined weight that signifies how much less desirable a miss handoff is compared to a false handoff. "−Km" and "Km" represent the two limits of a measurement range. The measurement range represents a physical region where a handover event may occur. The measurement range is the region that at least two RSRPs including the measured server power 116 are higher than a reliable RSRP level (a lower threshold) and the measured server power 116 is lower than an upper threshold of the RSRP level. Both the lower and the upper thresholds can be system variables provided by the base stations 108. "Kh" represents the sampling instance or tap where the mobile station 106 is expected to trigger a handoff event given the handoff hysteresis level 302.

The predicted probability of handoff "$Pr_{Ho}^{Pred}$", the probability of false handoff "$Pr_F(k+K)$", and the probability of missed handoff "$Pr_M(k+K)$" can be described by Equations 5, 6, and 7:

$$Pr_{HO}^{Pred}(k+K) = Pr\{e(k+K) > P_S(k+K) - P_c(k+K) + h\} \qquad \text{Eq. 5}$$
$$= Q\left(\frac{a^K((k) - P_c(k)) + h - 2P_{PL}}{(\sigma_{e,k}^2 + 2\sigma_{k+K}^2)^{1/2}}\right).$$

$$Pr_F(k+K) = Pr_{HO}^{Pred}(k+K), \mu_{k+K} > h. \qquad \text{Eq. 6}$$

$$Pr_M(k+K) = 1 - Pr_{HO}^{Pred}(k+K), \mu_{k+K} < h \qquad \text{Eq. 7}$$

"$\sigma_{e,k}$" in the equations above represents the variance of the estimation error 306. Q in the equation above describes a Q-function, or a tail probability distribution of the standard normal distribution. "h" in the equations above represents the default hysteresis level 312. "$P_c$" represents the measured target power 118, and "$P_s$" represents the measured server power 116. The variance of the estimation error 306 can be described by Equation 8:

$$\sigma_{e,k}^2 = 1/P_c + 1/P_s \qquad \text{Eq. 8}$$

As shown in FIG. 3, the point "$d_h$" represents the distance from the server station 112 to a point along a straight line from the server station 112 to the target station 114 where the future target power 122 is higher than the future server power 120 by the handoff hysteresis level 302. The zero point for the distance measure d=0 is the point that the measured server power 116 and the measured target power 118 are equal.

The probability of false handoff occurring exists in the range $[-d_m, d_h]$, while the probability of a missed handoff occurring exists in the range $[d_h, d_m]$. $[-d_m, d_m]$ represents the measurement range of the mobile station 106. Assuming constant velocity, Km and Kh above can be calculated from $d_m$ and $d_h$. Thus, $d_h$ can be described by Equation 9:

$$d_h = e^{(h-2P_{PL})/2\eta}. \qquad \text{Eq. 9}$$

It has been discovered that the mobile telecommunication system 100 can accurately approximate the prediction error 308 and the estimation error 306 so that the mobile telecommunication system 100 can reduce the number of call drops even when utilizing a prediction model. The prediction error 308 and the estimation error 306 allow the mobile telecommunication system 100 to solve for the wrong handoff probability 314 as a function of the handoff hysteresis level 302. Accordingly, the mobile telecommunication system 100 can then solve for the handoff hysteresis level 302 that minimizes wrong handoffs, including missed handoffs and false handoffs that are results of prediction and estimations errors. With minimum wrong handoffs, the mobile telecommunication system 100 can reduce the number of call drops.

The mobile telecommunication system 100 can send a handoff trigger 316 from the mobile station 106 to the base stations 108 to initiate a handoff of the mobile station 106 from the server station 112 to the target station 114. The handoff trigger 316, for example, can be a digital message or an analog message.

It has also been discovered that the mobile telecommunication system 100 provides a more accurate handoff decision by sending the handoff trigger 316 from the mobile station 106 to initiate the handoff procedure with the base stations 108 instead of having the base stations 108 initiate the handoff. The mobile telecommunication system 100 can use an adaptive handoff mechanism that quantifies the estimation error 306 and the prediction error 308 to minimize the possibility of false handoffs and missed handoffs at the motion station 106. The adaptive generation of the handoff hysteresis level 302 does not require additional measurement on RSRP or additional signaling between mobile station and the base station. This can reduce the processing time and thus minimize opportunities for signal attenuation of the RSRP used for handoff mechanisms.

The trace graph of FIG. 3 also shows a service failure threshold 318. The service failure threshold 318 is defined as a RSRP level at which a service failure event can occur. "$D_{M,SF}$" represents when the measured server power 116 drops below the service failure threshold 318. "$-D_{M,SF}$" represents when the measured target power 118 drops below the service failure threshold 318.

Figure 4:
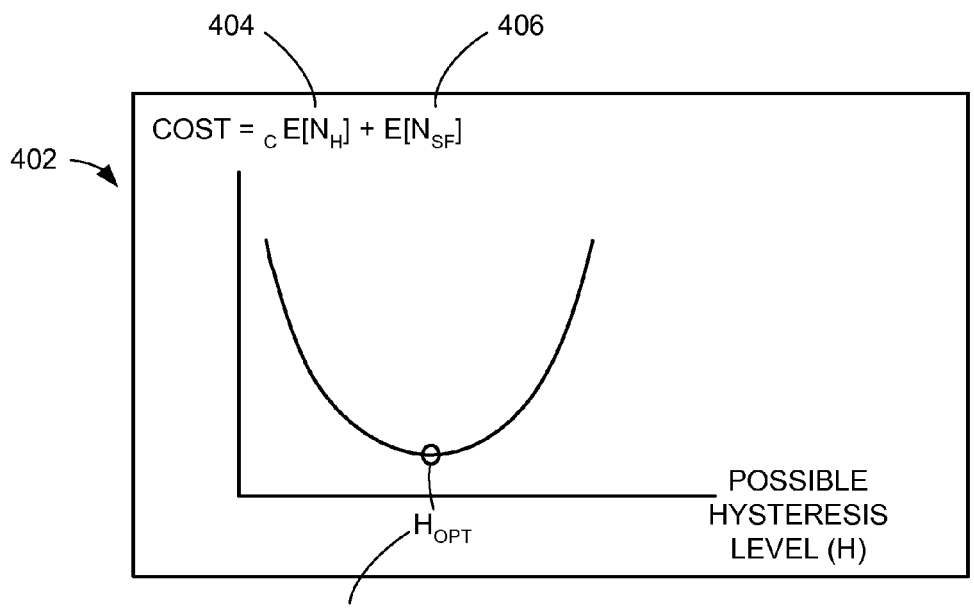
FIG. 4 is an example of a cost function of a handoff mechanism of the mobile telecommunication system of FIG. 1

Referring now to FIG. 4, therein is shown an example of a cost function 402 of a handoff mechanism of the mobile telecommunication system 100 of FIG. 1. Whether the mobile station 106 of FIG. 1 should be handed off from the server station 112 of FIG. 1 to the target station 114 of FIG. 1 can also be governed by the cost function 402. The cost function 402 is defined as a tradeoff relation equation for measuring the performance of the handoff mechanisms of mobile telecommunication systems. For example, the cost function 402 can be as described in Equation 10:

$$\min_{\Phi}\{cE[N_h]+E[N_{SF}]\} \quad \text{Eq. 10}$$

A target handoff mechanism can be measured by minimizing both quantities of the expected number of handoffs, $E[N_h]$, and the expected number of service failures, $E[N_{SF}]$. The tradeoff parameter c is the relative cost of the number of handoffs and the number of service failures. This parameter can be viewed differently by the network entities owning the base stations 108 of FIG. 1, by the traffic channels of the communication channel 110 of FIG. 1, and by the mobile station 106.

The cost function 402 can be fixed or set by the base stations 108. If the cost function 402 is fixed, the mobile telecommunication system 100 may result in throughput loss or the decrease of the quality of service. These shortcomings of fixing the cost function 402 can be attributed to the estimation error 306 of FIG. 3 and the prediction error 308 of FIG. 3. The cost function 402 can be a network centric value set by the base stations 108. The server station 112 can set the cost function to maximize its utility function. The mobile station 106 can also set or keep the cost function 402 on the first storage unit 208 based on a utility function of the mobile station 106.

It has been discovered that the handoff hysteresis level 302 of FIG. 3 can be adaptively updated based on the cost function 402 to prevent throughput loss or the decrease of the quality of service despite the existence of the estimation error 306 and the prediction error 308. The cost function 402 can be adaptively calculated to account for the estimation error 306 and the prediction error 308. The cost function 402 can then be used to aid the mobile telecommunication system 100 in making the handoff decision and to calculate the handoff hysteresis level 302. Because the adaptive generation of the cost function 402 does not require additional measurement on RSRP or additional signaling between the mobile station 106 and the base stations 108, the adaptive calculation of the cost function 402 can minimize handoff delay and provide robust handoff decisions that minimizes both the number of handoffs and service failures.

The cost function 402 can be adaptively generated on the mobile station 106 for the purpose of minimizing the wrong handoff probability 314 of FIG. 3. Because the estimation error 306 and the prediction error 308 are modeled by the mobile telecommunication system 100 as independent and identically distributed, the future target power 122 of FIG. 1 and the future server power 120 of FIG. 1 can be seen as random variables whose variances come from the summations of the estimation error 306 and the prediction error 308. Given the measured server power 116 of FIG. 1 or the measured target power 118 of FIG. 1, the variances of the estimation error 306 and the prediction error 308 can be computed. From the variances of the prediction error 308, the estimation error 306, or both, the probabilities of handoff and wrongful handoff can be computed.

The cost function 402 involves balancing a handoff probability 404 and a service failure probability 406, and hence the handoff probability function is essential to adaptively optimizing the cost function 402. To compensate for the prediction error 308, the conditional mean can be approximated to be proportion to the prediction tap number 310 of FIG. 3, whereas the conditional variance is only slightly affected by the prediction tap number 310.

Minimizing the cost function 402 for the mobile telecommunication system 100 can be expressed as Equation 11:

$$\operatorname*{argmin}_{h}\{cPr_{HO}^{all} + Pr_{SF}^{all}\} \quad \text{Eq. 11}$$

Here, "c" represents the cost parameter. "$Pr_{HO}^{all}$" represents the total probability of a handoff occurring for the mobile station 106 from the server station 112 to the target station 114. "$Pr_{SF}^{all}$" represents the total probability of service failures occurring for the mobile station 106. "$Pr_{HO}^{all}$" and "$Pr_{SF}^{all}$" can be described by the following Equations 12 and 13:

$$Pr_{HO}^{all} = \sum_{k=-k_m}^{0} Pr_{HO}^{pred}(k) + \sum_{k=0}^{k_m}\left(1 - Pr_{HO}^{pred}(k)\right) \quad \text{Eq. 12}$$

$$Pr_{SF}^{all} = \sum_{k=-k_m}^{-k_{m,sf}} Pr_{HO}^{pred}(k+K) + \sum_{k=k_{m,sf}}^{k_m}\left(1 - Pr_{HO}^{pred}(k+K)\right) \quad \text{Eq. 13}$$

"$-k_{m,sf}$" and "$k_{m,sf}$" above represent the RSRP tap at which the future target power 122 and the future server power 120, respectively, fall below the service failure threshold 318. Here, where k equals to zero refers to the current RSRP tap. A positive k means a future RSRP tap, while a negative k represents a past RSRP tap. Assuming constant velocity and thus a linear decrease of the measured server power 116 and a linear increase of the measured target power 118, "$-k_{m,sf}$" and "$k_{m,sf}$" can be calculated from the service failure threshold 318. The mobile telecommunication system 100 can generate the handoff hysteresis level 302 by solving for the handoff hysteresis level 302 that satisfies Equation 11.

Equation 11 can be solved via Equation 14 below:

$$\delta\{cPr_{HO}^{all}+Pr_{SF}^{all}\}/\delta h=0 \quad \text{Eq. 14}$$

It has been discovered that selecting the handoff hysteresis level 302 that coincides with when the derivative of the cost function 402 as a function of the handoff hysteresis level 302 is zero can improve the stability of the mobile telecommunication system 100. It has been unexpectedly found that the cost function 402 as a function of the handoff hysteresis level 302 is a convex function. Where the derivative of the cost function 402 is zero, the cost function 402 is minimized and thus the number of handoffs and the number of service failures are minimized. Minimizing the cost function 402 creates a more stable telecommunication system. Accordingly, the handoff hysteresis level 302 at the level when the derivative of the cost function 402 is zero provides a more stable telecommunication system.

Further, as a specific example, the mobile telecommunication system 100 can use hysteresis-based handoff mechanism with upper and lower thresholds to get rid of unnecessary handoffs. For example, the mobile telecommunication system 100 can operate to determine the handoff hysteresis level 302 when the measured server power 120 is outside a range of signal strength. The mobile telecommunication system 100 can also operate to determine the handoff hysteresis level 302 when the estimation error 306 or the prediction error 308 is outside a range of error rate.

The adaptive handoff mechanism can function with a hysteresis-based mechanism where the handoff hysteresis level 302 is determined based on the wrong handoff probability 314. The adaptive handoff mechanism can also function with a locally optimum mechanism where the handoff hysteresis level 302 is determined based on the cost function 402. The adaptive handoff mechanism can further function with a differentiator mechanism where the handoff hysteresis level 302 is determined based on a rate of handoffs occurring.

It has been discovered that the mobile telecommunication system 100 can be made more robust by predicting and estimating the future server power 120 and the future target power 122 when the mobile station 106 is moving fast, such as when the mobile station 106 is moving at speeds higher than 100 km/hr. The future server power 120 and the future target power 122 allow the mobile telecommunication system 100 to determine the optimal tradeoff between the number of handoffs and the number of service failures. A high number of handoffs can cause network traffic overflow on the base stations 108. Accordingly, determining the handoff hysteresis level 302 based on the future server power 120 and the future target power 122 allows the mobile telecommunication system 100 to be robust against service failure and traffic overflow and thus reduce the number of call drops.

Figure 5:
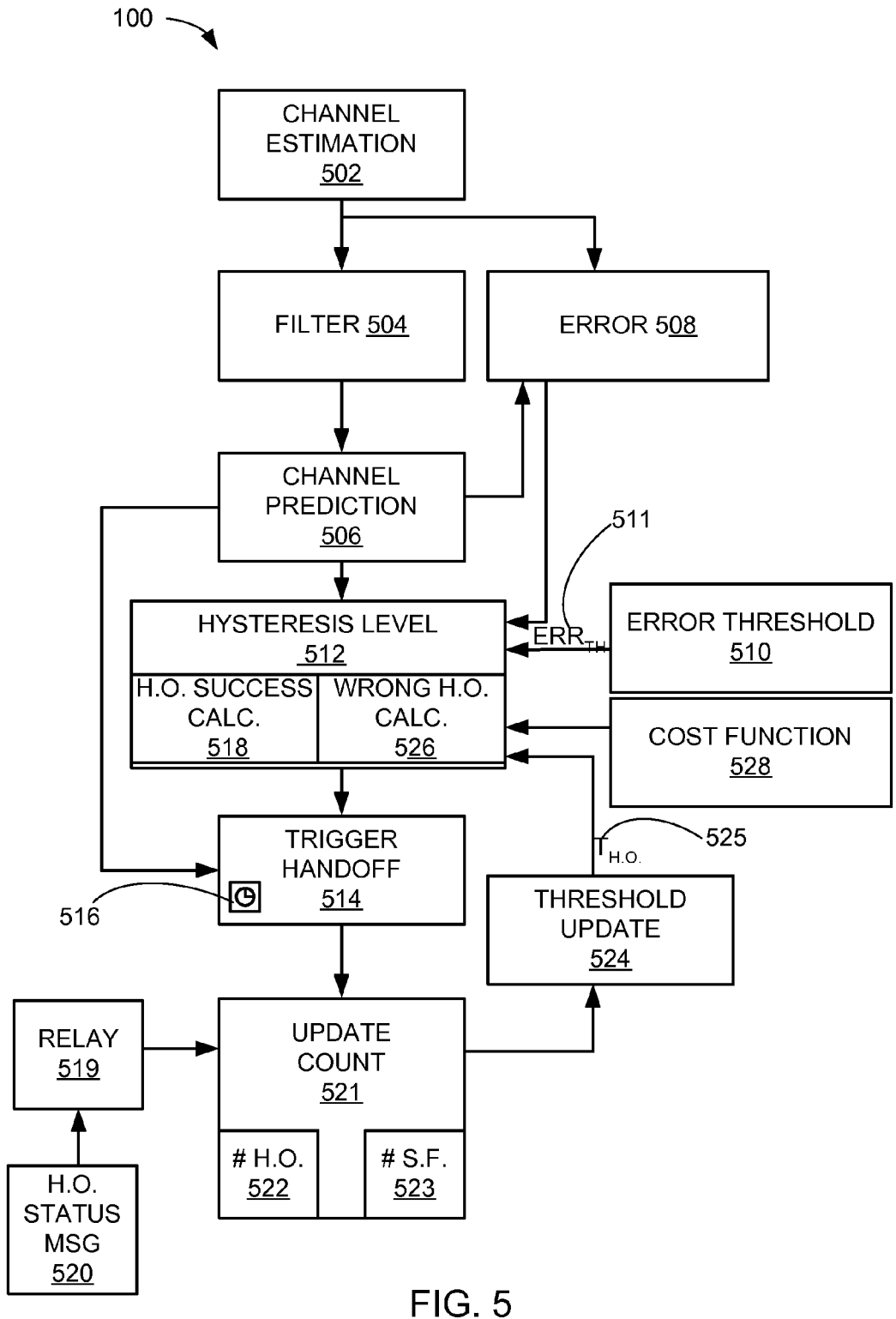
FIG. 5 is a control flow of the mobile telecommunication system.

Referring now to FIG. 5, therein is shown a control flow of the mobile telecommunication system 100. The mobile telecommunication system 100 can include a channel estimation module 502. The channel estimation module 502 is for taking RSRP measurements for estimating long term RSRP averages. The channel estimation module 502 can estimate by measuring the measured target power 118 of FIG. 1 and the measured server power 116 of FIG. 1 corresponding to the target station 114 of FIG. 1 and the server station 112 of FIG. 1. The channel estimation module 502 can function to measure the measured target power 118 and the measured server power 116 at the mobile station 106 through the communication channel 110 of FIG. 1.

The mobile telecommunication system 100 can include a filter module 504. The filter module 504 is for filtering by an infinite impulse response (11R) filter to mitigate the fast fading of RSRPs and portions of the estimation error 306 of FIG. 3. The filter module 504 can adjust the measured server power 116 and the measure target power 118 to mitigate some of the attenuation or amplification of the reference signal power through the communication channel 110.

The mobile telecommunication system 100 can include a channel prediction module 506. The channel prediction module 506 is for selecting an appropriate RSRP prediction mechanism and for predicting future levels of RSRPs at a number of sampling instances (taps) away from the present sampling instance. The channel prediction module 506 can function to predict the future target power 122 of FIG. 1 and the future server power 120 of FIG. 1 for the prediction tap number 310 of FIG. 3 away from when the measured target power 118 and the measured server power 116 are measured. The channel prediction module 506 can be coupled to the filter module 504. The channel prediction module 506 can also be directly coupled to the channel estimation module 502 (not shown).

The channel prediction module 506 can make the prediction of the future target power 122 and the future server power 120 based on the measured server power 116 and the measured target power 118 provided by the filter module 504 or the channel estimation module 502. The channel prediction module 506 can predict the future taps using different prediction mechanisms including the mechanism described in Equation 5

The channel prediction module 506 can also appropriately choose the prediction tap number 310 close to the time-to-trigger 304 of FIG. 3. While these can be the functions of other modules in the mobile telecommunication system 100, the channel prediction module 506 can also adjust the prediction tap number 310, and the handoff hysteresis level 302 of FIG. 3. The future server power 120 and the future target power 122 can be used to adjust the handoff parameters such as the handoff hysteresis level 302 of FIG. 3 and the cost function 402 of FIG. 4 by capturing the estimation error 306 and the prediction error 308 of FIG. 3. The future server power 120 and the future target power 122 can be used to minimize the probability of wrong handoff. The mathematical model used by the channel prediction module 506 can accurately represent channel characteristics of the communication channel 110 of FIG. 1 such as path loss and shadowing.

The mobile telecommunication system 100 can include an error module 508. The error module 508 can be coupled to the channel prediction module 506 and the channel estimation module 502. The error module 508 is for calculating error distributions associated with predicted RSRPs of the base stations 108 of FIG. 1 with the channel prediction module 506 or associated with using the measured RSRPs to estimate the long term average RSRPs with the channel estimation module 502.

The error module 508 can function to compute the estimation error 306 and the prediction error 308 associated with the future target power 122 and the future server power 120, with the future target power 122 and the future server power 120 received from the channel prediction module 506. The estimation error 306 and the prediction error 308 can be calculated based on Equations 1 and 2. When the mobile telecommunication system 100 decides the time-to-trigger 304, the mobile station 106 can statistically calculate the prediction error 308 and the estimation error 306 with the error module 508 based on the varying distance between the mobile station 106 and the server station 112.

The error module 508 can function to compute the estimation error 306 as proportional to an inverse of the measured target power 118 and the measured server power 116, with the measured target power 118 and the measured server power 116 from the channel estimation module 502. The error module 508 can function to compute the prediction error 308 by modeling the prediction error 308 as having a Gaussian distribution based on the prediction tap number 310. The error module 508 can function to use positioning device such as GPS and/or triangularization method to estimate the position and velocity of the mobile station 106 to enhance the mobility estimation. The error module 508 can function to calculate the distribution of error associated with approximating characteristics of the communication channel 110, such as the pathloss, shadow fading, and fast fading components of the communication channel 110, including the mean and variance of the estimation error 306 and the prediction error 308.

The mobile telecommunication system 100 can include an error threshold module 510. The error threshold module 510 is for determining an error threshold 511. The error threshold 511 is defined as a user-defined or system-defined limit to the percentile or magnitude of error that the mobile telecommunication system 100 can tolerate in making a handoff decision. For example, the error threshold module 510 can determine the error threshold 511 based on a user defined variable. The error threshold module 510 can calculate the error threshold 511 by a statistical model. The error threshold module 510 can determine the error threshold 511 through real-time sampling and experimentation.

The mobile telecommunication system 100 can include a hysteresis level module 512. The hysteresis level module 512 is for determining an optimized hysteresis level. The hysteresis level module 512 can choose the handoff hysteresis level 302 to minimize the probability of wrong handoff when the mobile station 106 is close to the target station 114. As a result, the mobile telecommunication system 100 can adaptively adjust the handoff hysteresis level 302 to have an optimum handoff probability by triggering the handoff at a preferred time. The mobile telecommunication system 100 can adjust the handoff parameters via the hysteresis level module 512 to minimize the wrong handoff probability 314 of FIG. 3.

The hysteresis level module 512 can be coupled to the error module 508. The hysteresis level module 512 can function to determine the handoff hysteresis level 302 based on the estimation error 306 and the prediction error 308, with the estimation error 306 and the prediction error 308 received from the error module 508.

The hysteresis level module 512 can be coupled to the error threshold module 510. The hysteresis level module 512 can function to determine the handoff hysteresis level 302 by increasing the handoff hysteresis level 302 when the estimation error 306 plus the prediction error 308 is greater than the error threshold 511 from the error threshold module 510. The hysteresis level module 512 can function to determine the handoff hysteresis level 302 by decreasing the handoff hysteresis level 302 when the estimation error 306 plus the prediction error 308 is less than the error threshold 511.

The mobile telecommunication system 100 can include a trigger handoff module 514. The trigger handoff module 514 is for triggering a handoff event when a handoff condition is met. The trigger handoff module 514 can execute the handoff by a command of the mobile station 106 or one of the base stations 108. The trigger handoff module 514 can have a timer 516 with a wait duration. The timer 516 can execute the handoff when one of the base stations 108 confirms the handoff event within the wait duration. The trigger handoff module 514 can also update the cell list of the base stations 108 when the handoff condition is met.

The trigger handoff module 514 can be coupled to the hysteresis level module 512. The trigger handoff module 514 can function to send the handoff trigger 316 of FIG. 3 from the mobile station 106 to the base stations 108. The handoff trigger 316 can be for sending the handoff trigger 316 for the mobile station 106 to be handed-off from the server station 112 to the target station 114 when the future target power 122 minus both the future server power 120 and the handoff hysteresis level 302 is greater than zero, with the handoff hysteresis level 302 received from the hysteresis level module 512. The handoff trigger 316 can be sent to the server station 112, the target station 114, or one or multiple of the base stations 108.

The trigger handoff module 514 can also function to send the handoff trigger 316 for the mobile station 106 to be handed-off from the server station 112 to the target station 114 when the future target power 122 minus both the future server power 120 and the handoff hysteresis level 302 is greater than zero for longer than the time-to-trigger 304. The mobile station 106 can measure the measured target power 118 and the measured server power 116 without being handed-off from the server station 112 until the mobile station 106 receives a confirmation of the handoff trigger 316 from the base stations 108.

The hysteresis level module 512 can include a handoff success calculation module 518. The handoff success calculation module 518 is for determining whether a handoff would be successful without service failure. The handoff success calculation module 518 can calculate the probability of handoff and the probability of service failure.

The handoff success calculation module 518 can be coupled to the channel prediction module 506 and the error module 508. The handoff success calculation module 518 can function to calculate the handoff probability 404 of FIG. 4 and the service failure probability 406 of FIG. 4 based on the default hysteresis level 312 of FIG. 3, the future server power 120, the future target power 122, the handoff hysteresis level 302, the estimation error 306, the prediction error 308, or a combination thereof. The future server power 120 and the future target power 122 can be received from the channel prediction module 506. The estimation error 306 and the prediction error 308 can be received from the error module 508.

The hysteresis level module 512 can function to determine the handoff hysteresis level 302 based on the handoff probability 404 and the service failure probability 406 from the output of the handoff success calculation module 518.

The mobile telecommunication system 100 can include a relay module 519. The relay module 519 is for relaying messages between the base stations 108 and the mobile station 106. The relay module 519 can function to receive messages from the base stations 108 regarding the service failure rate and the handoff frequency of the entire system. The relay module 519 can function to receive a handoff status message 520 from the server station 112 indicating whether the mobile station 106 have been handed-off without service failure. The base stations 108, including the server station 112 or the target station 114, can send the handoff status message 520 back to the mobile station 106 when a handoff is achieved or when service failure has occurred.

The mobile telecommunication system 100 can include a count update module 521. The count update module 521 is for counting the number of handoffs that has been triggered thus far and the number of service failures that has occurred thus far. The count update module 521 can be coupled to the relay module 519. The count update module 521 can function to update a handoff count 522 and a service failure count 523 based on the handoff status message 520, with the handoff status message 520 received from the relay module 519. The handoff count 522 and the service failure count 523 can be stored on the first storage unit 208 of FIG. 2

The mobile telecommunication system 100 can include a threshold update module 524. The threshold update module 524 is for calculating a wrong handoff threshold 525. The threshold update module 524 can be coupled to the count update module 521. The threshold update module 524 can function to calculate the wrong handoff threshold 525 based the handoff count 522 and the service failure count 523, with the handoff count 522 and the service failure count 523 received from the count update module 521. The threshold update module 524 can also calculate the wrong handoff threshold 525 based on user-defined system variables.

The hysteresis level module 512 can include a wrong handoff calculation module 526. The wrong handoff calculation module 526 is for calculating the wrong handoff probability 314 based on the optimized hysteresis level.

The wrong handoff calculation module 526 can operate recursively or iteratively with the hysteresis level module 512. The wrong handoff calculation module 526 can function to calculate the wrong handoff probability 314 from the future server power 120 and the future target power 122, and the handoff hysteresis level 302, with the handoff hysteresis level 302 received from the hysteresis level module 512. The hysteresis level module 512 can function to modify the handoff hysteresis level 302 when the wrong handoff probability 314 received from the wrong handoff calculation module 526 is below the wrong handoff threshold 525 of FIG. 5, with the wrong handoff threshold 525 received from the threshold update module 524.

The hysteresis level module 512 can modify the handoff hysteresis level 302 by solving for the handoff hysteresis level 302 which satisfies the condition that the absolute difference between the wrong handoff probability 314 and the wrong handoff threshold 525 is less than a wrong handoff tolerance level. The hysteresis level module 512 can also solve for the handoff hysteresis level 302 that minimizes the wrong handoff probability 314.

The wrong handoff probability 314 can be a function of the handoff hysteresis level 302. The error threshold 511 can be a pre-determined constant or a user-defined variable. The wrong handoff threshold 525 can be a value updated each time a handoff is made. For example, the mobile telecommunication system 100 can solve equations like these via a partial differential equation solver or a finite difference equation solver. Hence, the hysteresis level module 512 can function to determine the handoff hysteresis level 302 based on the handoff count 522 and the service failure count 523.

The mobile telecommunication system 100 can include a cost function module 528. The cost function module 528 is for updating the cost function 402. The cost function module 528 can function to update the cost function 402 based on the handoff count 522, the service failure count 523, the estimation error 306, the prediction error 308, the future target power 122, the future server power 120, or a combination thereof. The cost function module 528 can be coupled to the count update module 521 to receive the handoff count 522 and the service failure count 523 from the count update module 521. The cost function module 528 can be coupled to the error module 508 to receive the estimation error 306 and the prediction error 308 from the error module 508. The cost function module 528 can be coupled to the channel prediction module 506 to receive the future target power 122 and the future server power 120 from the channel prediction module 506.

The hysteresis level module 512 can be coupled to the cost function module 528 to receive the cost function 402. The hysteresis level module 512 can function to minimize the handoff hysteresis level 302 based on the cost function 402 by balancing the handoff probability 404 against the service failure probability 406 using the cost function 402. The cost function 402 can be based on Equation 10 above and in FIG. 4. The cost function 402 can be based on the prediction tap number 310. The prediction tap number 310 can be a pre-determined system variable or a user-defined parameter.

The first software 218 of FIG. 2 of the mobile station 106 of FIG. 1 can include the mobile telecommunication system 100. For example, the first software 218 can include the channel estimation module 502, the channel prediction module 506, the error module 508, the hysteresis level module 512, and the trigger handoff module 514.

The first control unit 206 of FIG. 2 can execute the first software 218 for the channel estimation module 502 to measure the measured target power 118 and the measured server power 116 at the mobile station 106 through the communication channel 110. The first control unit 206 can execute the first software 218 for the channel prediction module 506 to predict the future target power 122 and the future server power 120 for the prediction tap number 310 from when the measured target power 118 and the measured server power 116 are measured. The first control unit 206 can execute the first software 218 for the error module 508 to compute the estimation error 306 and the prediction error 308 associated with the future target power 122 and the future server power 120.

The first control unit 206 can execute the first software 218 for the hysteresis level module 512 to determine the handoff hysteresis level 302 based on the estimation error 306 and the prediction error 308. The first control unit 206 can execute the first software 218 for the trigger handoff module 514 to send the handoff trigger 316 for the mobile station 106 to be handed-off from the server station 112 to the target station 114 when the future target power 122 minus both the future server power 120 and the handoff hysteresis level 302 is greater than zero.

The first control unit 206 can execute the first display interface 226 of FIG. 2 to display the handoff count 522 and the service failure count 523. The second software 236 of FIG. 2 of the server station 112 of FIG. 1 can include the mobile telecommunication system 100. For example, the second software 236 can include the channel estimation module 502, the channel prediction module 506, the error module 508, the hysteresis level module 512, and the trigger handoff module 514.

The second control unit 228 of FIG. 2 can execute the second software 236 for the channel estimation module 502 to measure the measured target power 118 and the measured server power 116 at the mobile station 106 through the communication channel 110. The second control unit 228 can execute the second software 236 for the channel prediction module 506 to predict the future target power 122 and the future server power 120 for the prediction tap number 310 from when the measured target power 118 and the measured server power 116 are measured. The second control unit 228 can execute the second software 236 for the error module 508 to compute the estimation error 306 and the prediction error 308 associated with the future target power 122 and the future server power 120. The second control unit 228 can execute the second software 236 for the hysteresis level module 512 to determine the handoff hysteresis level 302 based on the estimation error 306 and the prediction error 308. The second control unit 228 can execute the second software 236 for the trigger handoff module 514 to send the handoff trigger 316 for the mobile station 106 to be handed-off from the server station 112 to the target station 114 when the future target power 122 minus both the future server power 120 and the handoff hysteresis level 302 is greater than zero. The second control unit 228 can execute the second display interface 234 of FIG. 2 to display the handoff count 522 and the service failure count 523.

The mobile telecommunication system 100 can be partitioned between the first software 218 and the second software 236. For example, the second software 236 can include the channel prediction module 506, the error module 508, the hysteresis level module 512, and the trigger handoff module

514. The second control unit 228 can execute modules partitioned on the second software 236 as previously described.

The first software 218 can include the channel estimation module 502. Based on the size of the first storage unit 208 of FIG. 2, the first software 218 can include additional modules of the mobile telecommunication system 100. The first control unit 206 can execute the modules partitioned on the first software 218 as previously described.

The first user interface 212 of FIG. 2 can receive the wrong handoff threshold 525 and the cost function 402 from the user, the mobile telecommunication system 100, or a combination thereof for the hysteresis level module 512, for example. The second control unit 228 can operate the second communication unit 230 to send the handoff status message 520 to the mobile station 106. The first control unit 206 can operate the first communication unit 210 of FIG. 2 to do the same. The first control unit 206 can operate the first software 218 to operate the location unit 214.

The second communication unit 230 of FIG. 2 can send the handoff status message 520 to the mobile station 106 through the communication channel 110 of FIG. 1.

The mobile telecommunication system 100 describes the module functions or order as an example. The modules can be partitioned differently. For example, the channel prediction module 506 and the error module 508 can be combined. Each of the modules can operate individually and independently of the other modules.

Furthermore, data generated in one module can be used by another module without being directly coupled to each other. For example, the trigger handoff module 514 can receive the future server power 120 and the future target power 122 from the channel prediction module 506 to determine when to send the handoff trigger 316 to the server station 112.

Moreover, the modules described above can be implemented in hardware and should be considered as hardware functional units in addition to those described in FIG. 2, embedded into the functional units described in FIG. 2, or a combination thereof. For the purposes of this application, the modules are hardware implementation when claimed in apparatus claims.

Figure 6:
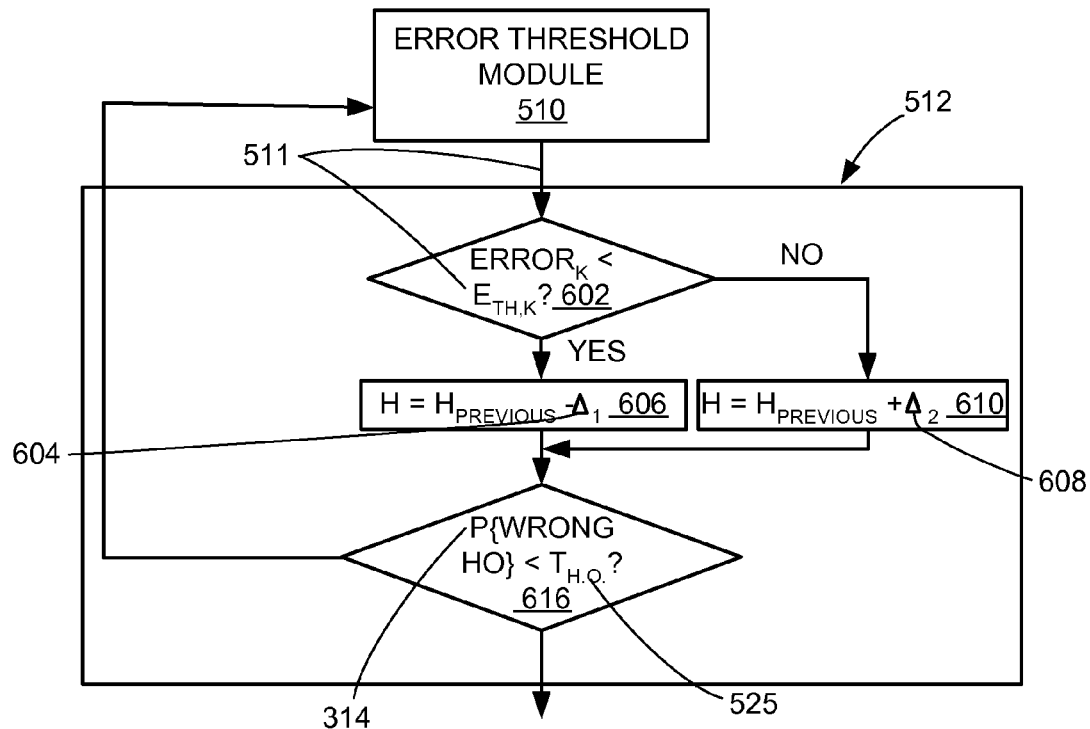
FIG. 6 is an example of a control flow of the hysteresis level module in conjunction to the error threshold module.

Referring now to FIG. 6, therein is shown an example of a control flow of the hysteresis level module 512 in conjunction to the error threshold module 510. The control flow includes comparing the estimation error 306 of FIG. 3 and the prediction error 308 of FIG. 3 with the error threshold 511, in a block 602. The control flow further includes that when the estimation error 306 and the prediction error 308 computed is lower than the error threshold 511, the handoff hysteresis level 302 can be decreased by a reduction 604, in a block 606. This comparison can be made by comparing the sum of the estimation error 306 and the prediction error 308 to the error threshold 511. Alternatively, the comparison can be made by comparing the estimation error 306 alone with the error threshold 511, or the prediction error 308 alone with the error threshold 511. In FIG. 6, "$ERROR_K$" can represent the estimation error 306, the prediction error 308, or both.

The control flow yet further includes that if the estimation error 306 and the prediction error 308 computed is not lower than the error threshold 511, the handoff hysteresis level 302 of FIG. 3 can be increased by an increment 608, in a block 610. The reduction 604 and the increment 608 are defined as user-defined values for incrementing or decrementing the handoff hysteresis level 302 in order to satisfy the Equation 4 above. The reduction 604 and the increment 608 can have the same absolute value.

The method includes computing the wrong handoff probability 314 in a block 616. This computation can include computing the wrong handoff probability 314 from the handoff hysteresis level 302 of FIG. 3, the estimation error 306, the prediction error 308, the measured target power 118 of FIG. 1, the measured server power 116 of FIG. 1, the prediction tap number 310 of FIG. 3, or a combination thereof. The wrong handoff probability 314 can be a weighted probability of missed handoff added to a weighted probability of false handoff. The wrong handoff probability 314 can be a sum of the probability distributions of these two events given a relative weighting on the missed handoff and the false handoff, such as described in Equation 15:

$$Pr_W^{Weighted} = w_F \sum_{k=-k_m}^{0} Pr_F(k) + (1 - w_F) \sum_{k=0}^{k_m} Pr_M(k) \qquad \text{Eq. 15}$$

When the wrong handoff probability 314 is smaller than the wrong handoff threshold 525 in the block 616, then the hysteresis level module 512 can pass the handoff hysteresis level 302 to the trigger handoff module 514 of FIG. 5 (not shown). When the wrong handoff probability 314 is not smaller than the wrong handoff threshold 525 in the block 616, then the mobile station 106 can compute the error threshold 511 again from the handoff hysteresis level 302 with the error threshold module 510. The block 602 to the block 616 can execute in an iterative or recursive fashion until the handoff hysteresis level 302 satisfies the condition in the block 616.

Figure 7:
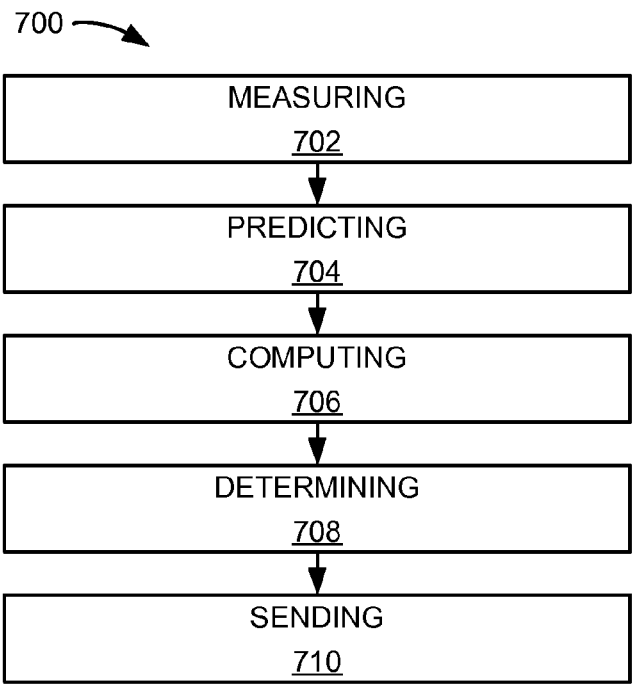
FIG. 7 is a flow chart of a method of operation of the mobile telecommunication system of FIG. 1 in a further embodiment of the present invention.

Referring now to FIG. 7, therein is shown a flow chart of a method 700 of operation of the mobile telecommunication system in a further embodiment of the present invention. The method 700 includes: measuring a measured target power and a measured server power, in a block 702; predicting a future target power and a future server power for a prediction tap number from when the measured target power and the measured server power are measured, in a block 704; computing an estimation error and a prediction error associated with the future target power and the future server power, in a block 706; determining a handoff hysteresis level based on the estimation error and the prediction error, in a block 708; and sending a handoff trigger for transferring a mobile station from a server station to a target station when the future target power minus both the future server power and the handoff hysteresis level is greater than zero, in a block 710.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or

What is claimed is:

1. A method of operation of a mobile telecommunication system comprising:
   measuring a measured target power and a measured server power;
   predicting a future target power and a future server power for a prediction tap number from when the measured target power and the measured server power are measured;
   computing an estimation error and a prediction error associated with the future target power and the future server power;
   determining a handoff hysteresis level with a control unit based on the estimation error and the prediction error; and
   sending a handoff trigger for transferring a mobile station from a server station to a target station when the future target power minus both the future server power and the handoff hysteresis level is greater than zero;
   receiving a handoff status message for indicating whether the mobile station have been handed-off based on the handoff trigger without service failure;
   updating a handoff count and a service failure count on a first storage unit based on the handoff status message; and
   wherein:
   determining the handoff hysteresis level includes determining the handoff hysteresis level based on the handoff count and the service failure count.

2. The method as claimed in claim 1 wherein determining the handoff hysteresis level includes increasing the handoff hysteresis level when the estimation error plus the prediction error is greater than an error threshold.

3. The method as claimed in claim 1 wherein determining the handoff hysteresis level includes decreasing the handoff hysteresis level when the estimation error plus the prediction error is less than the error threshold.

4. The method as claimed in claim 1 further comprising:
   calculating a wrong handoff probability from the handoff hysteresis level; and
   wherein:
   determining the handoff hysteresis level includes modifying the handoff hysteresis level when the wrong handoff probability is below a wrong handoff threshold.

5. A method of operation of a mobile telecommunication system comprising:
   measuring a measured target power and a measured server power;
   predicting a future target power and a future server power for a prediction tap number from when the measured target power and the measured server power are measured;
   computing an estimation error and a prediction error associated with the future target power and the future server power;
   determining a handoff hysteresis level with a control unit based on the estimation error and the prediction error;
   sending a handoff trigger for transferring a mobile station from a server station to a target station when the future target power minus both the future server power and the handoff hysteresis level is greater than zero for longer than a time-to-trigger;
   receiving a handoff status message for indicating whether the mobile station have been handed-off based on the handoff trigger without service failure;
   updating a handoff count and a service failure count on a first storage unit based on the handoff status message; and
   wherein:
   determining the handoff hysteresis level includes determining the handoff hysteresis level based on the handoff count and the service failure count.

6. The method as claimed in claim 5 further comprising:
   calculating a handoff probability and a service failure probability based on the prediction error; and
   wherein:
   determining the handoff hysteresis level includes determining the handoff hysteresis level based on calculated the handoff probability and the service failure probability.

7. The method as claimed in claim 5 wherein computing the estimation error includes computing the estimation error as proportional to an inverse of the measured target power and the measured server power.

8. The method as claimed in claim 5 wherein computing the prediction error includes modeling the prediction error as having a Gaussian distribution based on the prediction tap number.

9. The method as claimed in claim 5 wherein determining the handoff hysteresis level includes determining the handoff hysteresis level by minimizing the handoff hysteresis level based on a cost function optimized to balance the handoff probability against the service failure probability.

10. A mobile telecommunication system comprising:
    a hardware control unit configured to:
    measure a measured target power and a measured server power,
    predict a future target power and a future server power for a prediction tap number from when the measured target power and the measured server power are measured,
    compute an estimation error and a prediction error associated with the future target power and the future server power,
    determine a handoff hysteresis level based on the estimation error and the prediction error,
    send a handoff trigger for transferring a mobile station from a server station to a target station when the future target power minus both the future server power and the handoff hysteresis level is greater than zero, and
    a communication unit, coupled to the control unit, configured to:
    receive a handoff status message from the server station; and
    wherein the hardware control unit is configured to:
    indicate whether the mobile station have been handed-off based on the handoff trigger without service failure;
    update a handoff count and a service failure count on a first storage unit; and
    determine the handoff hysteresis level based on the handoff count and the service failure count.

11. The system as claimed in claim 10 wherein the hardware control unit is configured to increase the handoff hysteresis level when the estimation error plus the prediction error is greater than an error threshold.

12. The system as claimed in claim 10 wherein the hardware control unit is configured to decrease the handoff hysteresis level when the estimation error plus the prediction error is less than the error threshold.

13. The system as claimed in claim 10 wherein the hardware control unit is configured to:
    calculate a wrong handoff probability from the handoff hysteresis level; and modify the handoff hysteresis level when the wrong handoff probability is below a wrong handoff threshold.

14. The system as claimed in claim 10 wherein the hardware control unit is configured to send the handoff trigger for the mobile station to be handed-off from the server station to the target station when the future target power minus both the future server power and the handoff hysteresis level is greater than zero for longer than a time-to-trigger.

15. The system as claimed in claim 14 wherein the hardware control unit is configured to:
    calculate a handoff probability and a service failure probability based on the measured target power, the measured server power, and the estimation error; and
    determine the handoff hysteresis level based on calculated the handoff probability and the service failure probability.

16. The system as claimed in claim 14 wherein the hardware control unit is configured to compute the estimation error as proportional to an inverse of the measured target power and the measured server power.

17. The system as claimed in claim 14 wherein the hardware control unit is configured to predict the prediction error includes modeling the prediction error as having a Gaussian distribution based on the prediction tap number.

18. The system as claimed in claim 14 wherein the hardware control unit is configured to determine the handoff hysteresis level by minimizing the handoff hysteresis level based on a cost function optimized to balance the handoff probability against the service failure probability.

* * * * *